No. 803,826. PATENTED NOV. 7, 1905.
G. E. HOLMES & A. G. & J. M. BOSTROM.
COMBINATION SOFA AND BED.
APPLICATION FILED AUG. 31, 1904.

4 SHEETS—SHEET 1.

Witnesses.
C. H. Kinney,
Anna F. Schmidtbauer

Inventors.
Gustav E. Holmes
Axel G. Bostrom
John M. Bostrom
By Benedict & Morsell
Attorneys No. 803,826. PATENTED NOV. 7, 1905.
G. E. HOLMES & A. G. & J. M. BOSTROM.
COMBINATION SOFA AND BED.
APPLICATION FILED AUG. 31, 1904.

4 SHEETS—SHEET 2.

Witnesses.
Inventors.
Gustav E. Holmes
Axel G. Bostrom
John M. Bostrom
By Benedict & Morsell
Attorneys.

No. 803,826. PATENTED NOV. 7, 1905.
G. E. HOLMES & A. G. & J. M. BOSTROM.
COMBINATION SOFA AND BED.
APPLICATION FILED AUG. 31, 1904.

4 SHEETS—SHEET 3.

Witnesses.
Inventors.
Gustav E. Holmes
Axel G. Bostrom
John M. Bostrom
By Benedict Morsell
Attorneys.

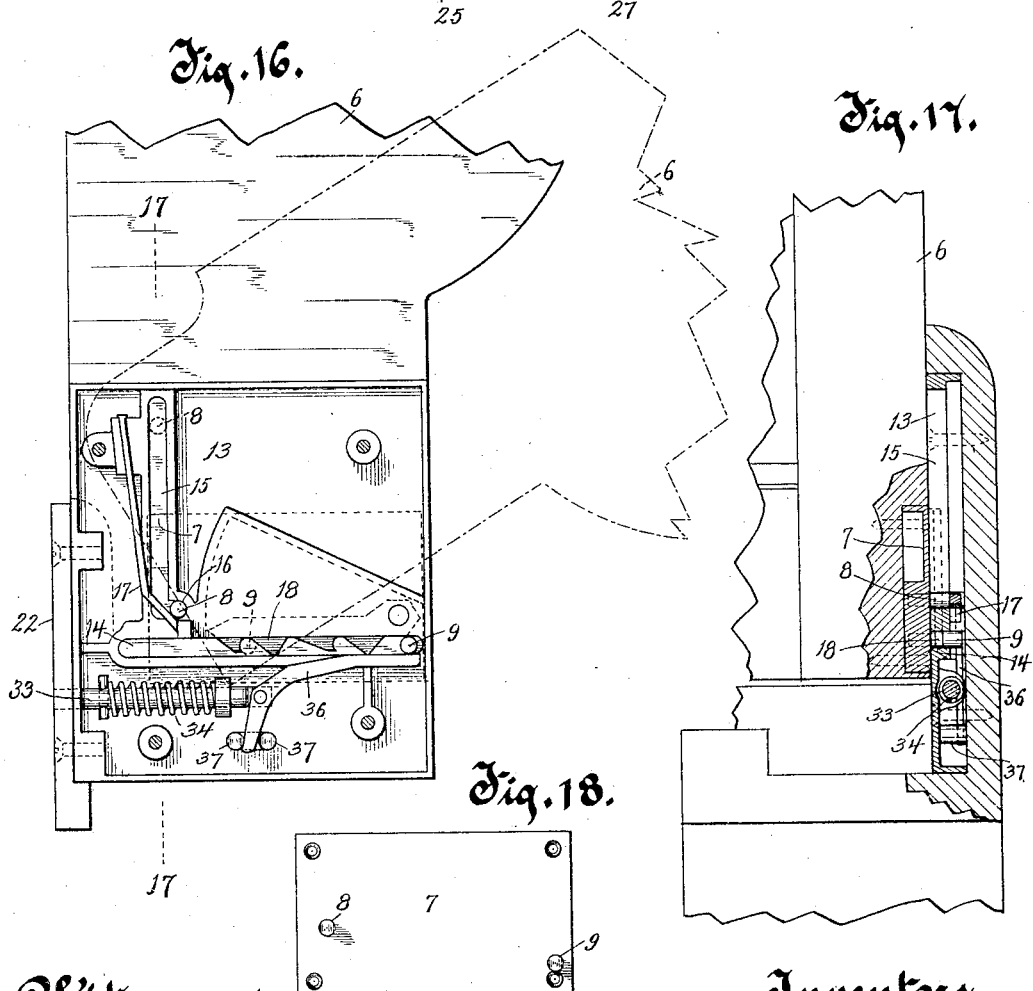

UNITED STATES PATENT OFFICE.

GUSTAV E. HOLMES, AXEL G. BOSTROM, AND JOHN M. BOSTROM, OF MILWAUKEE, WISCONSIN.

COMBINATION SOFA AND BED.

No. 803,826.   Specification of Letters Patent.   Patented Nov. 7, 1905.

Application filed August 31, 1904. Serial No. 222,811.

*To all whom it may concern:*

Be it known that we, GUSTAV E. HOLMES, AXEL G. BOSTROM, and JOHN M. BOSTROM, residing in Milwaukee, in the county of Milwaukee and State of Wisconsin, have invented new and useful Improvements in Combination Sofas and Beds, of which the following is a description, reference being had to the accompanying drawings, which are a part of this specification.

This invention relates to a sofa so formed and constructed that it can be readily converted into a bed of an improved form and by improved means embodied therein.

The invention consists of the structure, its parts, and combinations of parts as herein described and claimed or the equivalents thereof.

Figure 1:
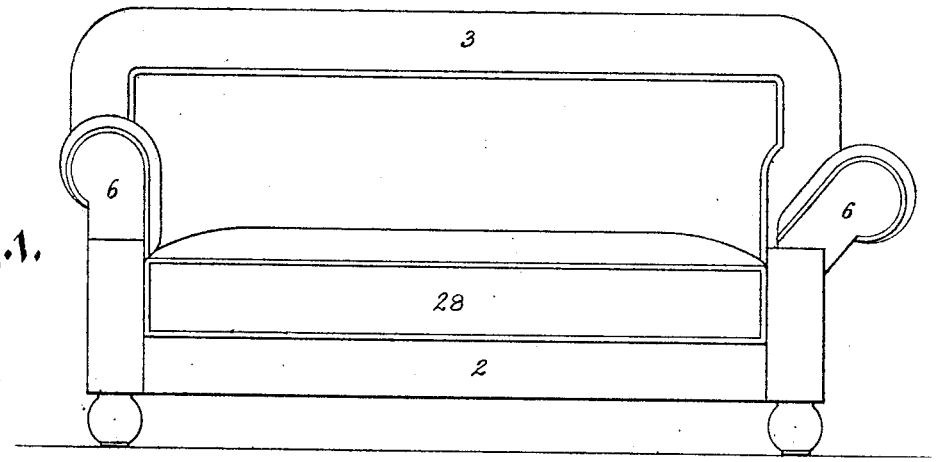
Figure 2:
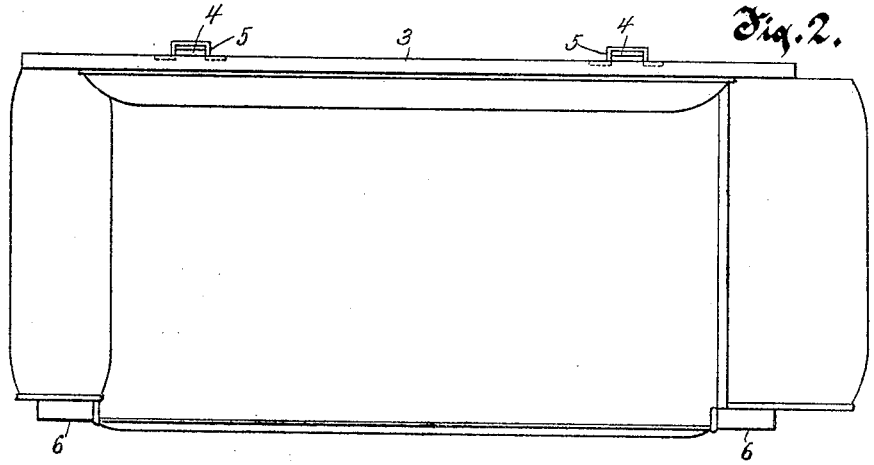
Figure 3:
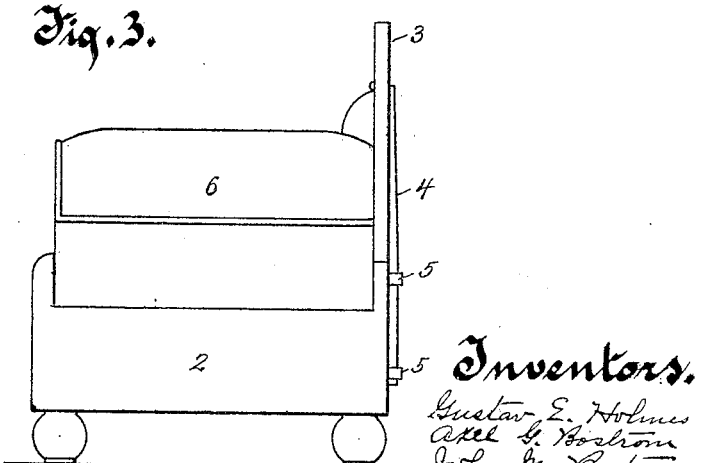
Figure 4:
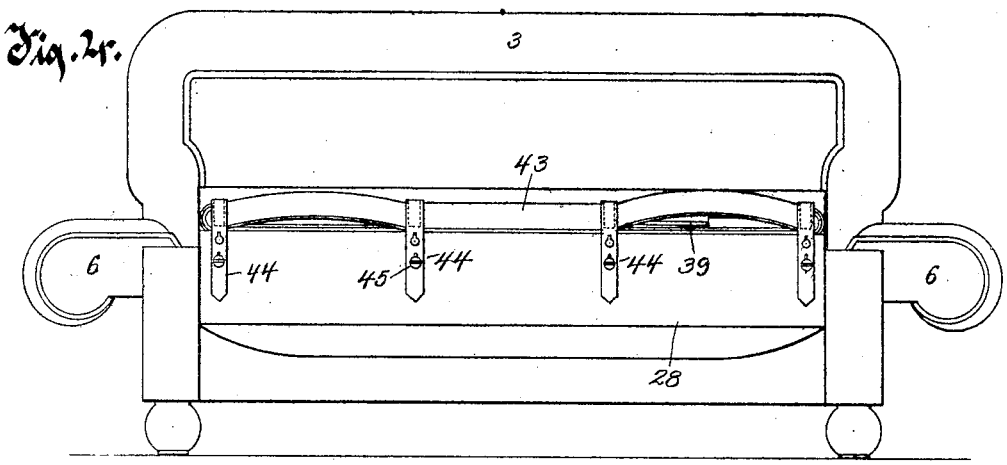
Figure 5:
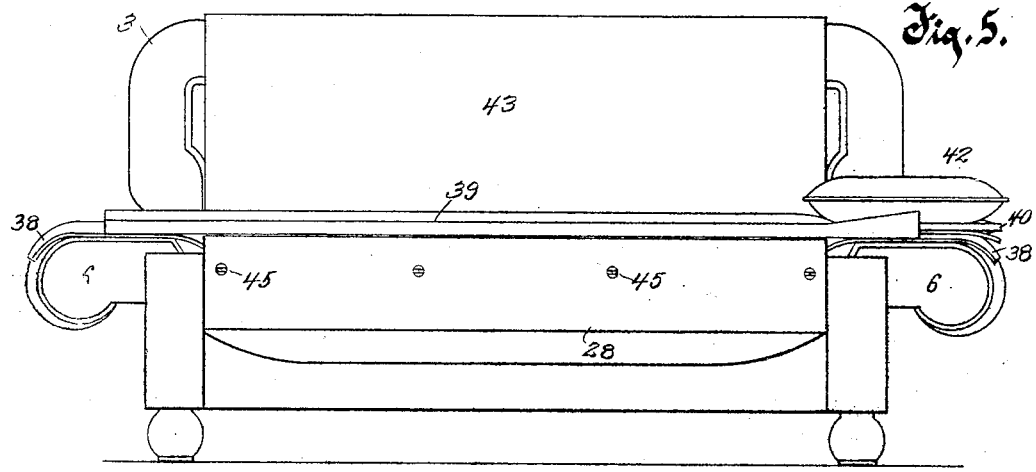
Figure 6:
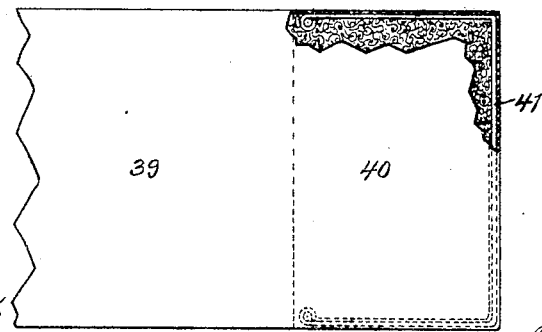
Figure 7:
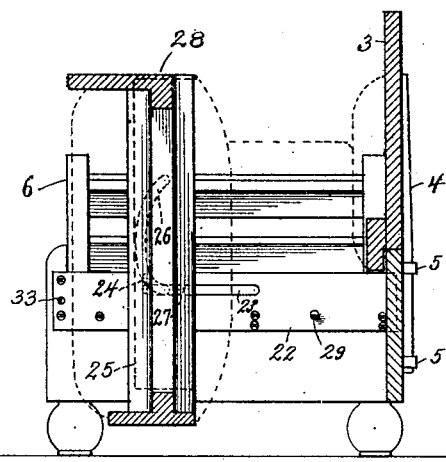
Figure 8:
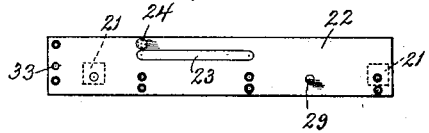
Figure 10:
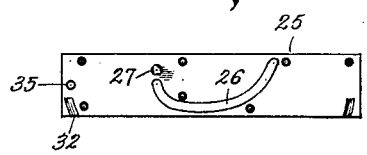
Figure 9:
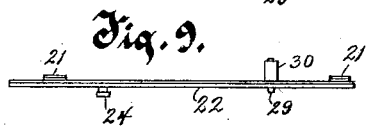
Figure 11:
Figure 12:
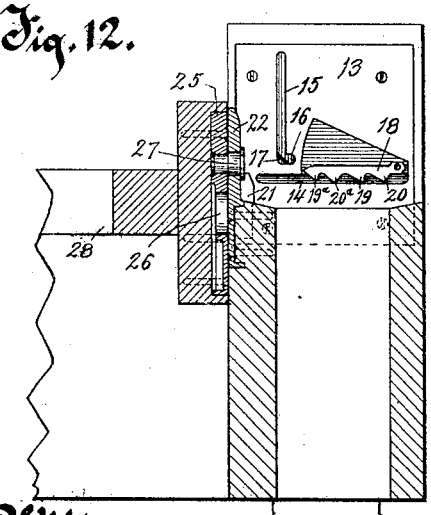
Figure 13:
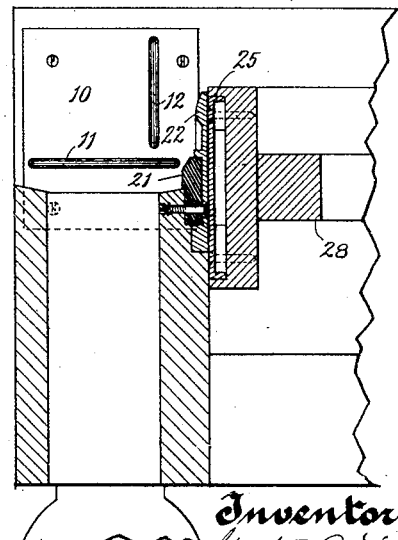

In the drawings, Figure 1 is an elevation of the sofa, one arm being tilted to a position in which it can be placed by means of mechanism provided therefor. Fig. 2 is a plan of the sofa in the form and position shown in Fig. 1. Fig. 3 is an end view of the sofa. Fig. 4 is a front view of the structure when the sofa-arms have been thrown down into horizontal position and the seat of the sofa has been turned over bottom upward in the process of converting the sofa into a bed. Fig. 5 is a view of the structure completely converted into a bed. Fig. 6 is a fragment of the mattress construction broken away to exhibit in detail a means for stiffening this portion of the mattress construction. Fig. 7 is a central transverse section of the structure in which the seat of the sofa and bed-frame is shown in the process of being shifted from the position in which it serves as a sofa-seat to the position in which it serves as a bed-bottom, the seat and bed-bottom being shown at a quarter-revolution. Figs. 8 and 9 show, respectively, the face and edge of a member of the seat-hinging device. Figs. 10 and 11 show, respectively, the face and edge of the complementary plate member of the seat-hinging device. Fig. 12 is a transverse section of the end of the frame of the sofa across the plates of Figs. 8 to 11 looked at from the rear. Fig. 13 is a transverse section of the end of the frame of the sofa through the plates shown in Figs. 8 to 11 on a different plane from that of Fig. 12 and looked at from the front. Fig. 14 is a detail of a yielding stop. Fig. 15 is a plan of the two plates of Figs. 8 and 10 in position in relation to each other. Fig. 16 illustrates mechanism that holds the sofa-arms in position and locks the bed-bottom. Fig. 17 is a view at a right angle to that of Fig. 16, parts being broken away to show interior construction; and Figs. 18 and 19 are respectively a front and an edge view of a hinge member secured to an arm of the sofa.

In the drawings, 2 indicates the body or main portion of the frame of the structure. The upright back 3, which forms also a part of the principal frame, is secured detachably to the body part of the frame 2 by means of strips or bars 4 4, secured permanently to the rear surface of the back 3 and projecting therefrom enter detachably brackets 5 5, secured to the rear side or rail member of the body of the frame.

The arms 6 6 of the sofa are hinged to the body of the frame in such manner that they can be thrown over laterally into inclined positions or down into the horizontal positions shown in Figs. 4 and 5, in which horizontal positions they are adapted to form extended end portions of a bed-bottom when the structure is converted into such bed. To so hinge the arms to the body of the frame that not only they can be shifted to the several positions which it is arranged that they can be put into, but so that also they will be held securely in those positions, devices are employed that are shown most fully in Figs. 12, 13, 16, 17, 18, and 19. Plates 7 7, Figs. 18, 19, each provided with fixed projecting pins 8 and 9, are respectively let into and secured to the front and rear ends of each arm 6, near the lower edge thereof, each plate being a hinge member. A plate 10, Fig. 13, provided with a horizontal slot 11 and a vertical slot 12, is secured to the body of the frame opposite each of the plates 7 of the rear ends of the arms 6. The pin 9 enters loosely the slot 11, and the pin 8 enters loosely the slot 12. A plate 13, Fig. 12, provided with a horizontal slot 14 and an upright slot 15, is fixed to the body of the frame opposite each of the plates 7 on the front ends of the arms 6, and the pins 8 and 9 on these plates 7 enter, respectively, the slots 15 and 14 on the plates 13. The plate 13 is provided with a pin-socket 16, extending laterally from the slot 15, at the lower end thereof, the socket being adapted to receive the pin 8 therein and by its walls to hold the pin releasably in position, by which means the sofa-arm is held in its upright position releasably. A spring 17, Fig. 16, secured to the rear surface of the plate 13, is adapted to hold the pin 8 releasably in place in the socket 16. An arm of the sofa being in its upright position, as shown in full lines in Fig. 16, and locked in place by the pin 8 in the socket 16, it is necessary only to press inwardly on the outer surface of the arm at its lower front end to push the pin rearwardly against the spring 17, and thereby release the pin from the socket 16, so that the pin can move upwardly in the slot 15, thereby permitting the arm to tilt over outwardly. It will be understood that the pins 8 and 9 on the plates 7, that are secured to the arms 6, being adapted to travel freely in the slots in the plates 10 and 13 on the frame, form a hinge construction adapted to permit of the tilting and throwing down of the sofa-arms to the extent hereinbefore suggested and that the pins 8 when in the sockets 16 lock the arms securely in upright position releasably.

To secure the arms in tilted or thrown-down positions releasably, a toothed latch 18 is employed, one with each arm 6, at the front end thereof, which latch is hinged to the plate 13 in such manner that its teeth are adapted to engage or cause the latch to be lifted by the pin 9 in the slot 11 or 14, respectively. The teeth 19 and $19^a$ on the latch 18 are adapted, respectively, to engage and hold onto the pin 9, while the teeth 20 and $20^a$ on the latch are so inclined as to be adapted by contact with the moving pin 9 to slide thereon and cause the latch to be lifted out of the path of the pin. The construction is such that when by the method hereinbefore described an upright arm 6 is released from its upright position and is tilted outwardly the pin 9 at once contacts with the lifting-tooth 20 and raises the latch 18, so that the pin 9 comes to and is engaged by the tooth 19 as the latch falls by gravity and locks the sofa-arm in its second position. This occurs when the tilting of the sofa-arm is done slowly; but if the sofa-arm is tilted quickly the latch 18 will by the contact of the pin 9 with the tooth 20 be thrown up, and if the movement of the sofa-arm outwardly is quick enough the pin 9 will pass beyond the tooth 19 and will contact with the tooth $20^a$ on the falling latch 18, which will thereby be lifted again, and the pin will pass beyond that tooth and will then be engaged by the tooth $19^a$ on the latches 18, by which means the arm 6 will be held in its third or second tilted position; but if the movement of the pin 9 rearwardly when in contact with the inclined teeth 20 and $20^a$ is quick, the latch 18 will be lifted to such extent that the pin will pass entirely beyond the latch 18, and the pins may then go to the extreme ends of the slots 11 and 14. In this manner the arms may be let down to their horizontal positions, (shown in Figs. 4 and 5,) in which they are adapted to be used as portions of the bed-bottom. Rubber bumpers 21 are advisably employed, and these are secured to the frame in such position that the arms 6 engage them as they go down to horizontal positions and prevent breaking of the pins and obviate noise.

To provide for shifting the seat of the sofa to convert the structure into a bed, means are furnished for so mounting the sofa-seat in the body of the frame that it can be turned over bottom upward. This is done by so mounting the seat that it has an axis longitudinally about which it can be swung; but as the sofa-seat, which is a comparatively wide one, is in the sofa located near the floor on which the sofa stands the longitudinal pivotal axis of the seat cannot be along its central line between the front and rear edges of the seat, nor can it be always nearer one edge of the seat than the other edge, but must be made shiftable, and for this purpose a novel structure is provided. For this purpose a plate 22, Figs. 7, 8, one at each end of the sofa, is secured in horizontal position to the inner surface of the end rail of the body of the frame, which plate is provided with a horizontally-disposed slot 23 and with a fixed projecting hinge-pin 24. A complementary hinge-plate 25, Fig. 10, provided with a curved slot 26 and a projecting hinge-pin 27, is secured one at each end to the seat-frame 28 opposite and complementary to the plate 22, so that the pin 24 enters the slot 26 and the pin 27 enters the slot 23, thereby forming a shifting hinge connection between the seat-frame 28 and the body 2 of the frame of the sofa. It will be understood that by this construction as the front edge of the seat-frame is lifted, and thereby thrown up into the position shown in Fig. 7, the seat-frame will assume a position in which the greater portion of its width is above the slot 22, so that the frame will not strike the floor when it is being turned over and so that when the frame is completely turned over into the position shown in Figs. 4 and 5 its initially front edge will fit not too closely, but properly, to the back of the sofa.

The wider part of the sofa-seat and bed-frame is at the front when the structure is to be used as a sofa, and this is held against tilting downwardly by the pins 24 in the slots 26 and the pins 27 in the slots 23, which bear against the end walls of the slots and prevent the seat from tilting down at the front; but when the seat is turned over for a bed the wider part with relation to the pivots by which the seat is hinged is at the rear, and to prevent its tilting down at the rear two pins 29, one in and projecting from each of the plates 22, are adapted to receive thereon the frame of the seat or bed and support the rear portion of it. These pins 29 are supported in boss-bearings 30 therefor on the plates 22 and are movable endwise therein, being held yieldingly up to their work by springs 31, and when the seat is turned over again to its normal position beveled or inclined surfaces 32 on the plates 25 will contact with the ends of the pins 29 and will push them back out of the paths of the plates 25.

For automatically locking the seat when turned over and used as a bed-frame in position bolts 33 are employed, which bolts are mounted movable endwise on the plates 13 and are held up to their work by springs 34. The bolts extend through the plates 22, fastened on the body of the frame, and enter apertures 35 in the plates 25, secured on the ends of the seat-frame, thereby locking it in place. To automatically withdraw these bolts 33 from the seat-frame, thereby releasing it, so that it can be turned back into position for a sofa-seat, shifting levers 36 are provided, which are in bent form approximating bell-crank levers, and one arm of these levers is inserted loosely between bearing-studs 37 on the plates 13, and at their angle the levers are pivoted to the bolts 33, and their other arms are arranged to bear upwardly against the pins 9. The construction is such that when the sofa-arms 6 are in their upright position the pins 9 will be in the relative positions shown in Fig. 16, in which positions they so bear down on the outer arms of the levers 36 that the bolts 37 are withdrawn from engagement with the plates 25 on the seat or bed-frame; but if the sofa-arms 6 are thrown down, thereby shifting the pins 9 to the other extremities of the slots 11 and 14, the shifting levers 36 will thereby be released, and the bolts 33 by their springs 34 will be thrown forward into engagement with the plates 25.

Flexible aprons 38, conveniently made of heavy cloth, are secured to the bed-bottom, which is a suitable designation of the under side of the seat of the sofa, and these flaps or aprons when the seat is turned over so as to form a bed-bottom are turned outwardly and rest on the then upper surfaces of the arms 6. A mattress 39 is provided, which rests on the bed-bottom, and at one end, which is intended to serve for the head of the bed, this mattress is provided with a flap 40, which has therein around the margin of it a wire stiffener 41, which is conveniently secured in place by putting it between the upper and lower parts of the mattress and stitching it in. When the bed is to be used, this flap 40 is unfolded and extends outwardly over and rests on the arm 6. When the bed is to be folded together and the structure is to be converted into a sofa, the pillow 42 is placed on the mattress directly on the bed-bottom, and the flaps 40 and 38 at both ends are folded inwardly toward the middle of the bed, and a larger apron or cover 43, which is secured at one edge to the seat-frame, is folded over the bedding, and straps 44, which are also secured to the front rail of the seat-frame, are brought over the cover and the bedding and are caught onto pins 45 in the opposite rail of the bed-bottom.

What we claim as our invention is—

1. In a sofa, a main frame, an arm, and means for hinging and securing the arm in place on the frame, comprising two pins at a distance apart on one end of the arm, a plate opposite said pins fixed in the main frame and provided with a horizontal and a vertical slot, the vertical slot having a terminal laterally-extending recess at the lower end into which slots said pins enter and are movable, and a spring adapted to hold the pin of the vertical slot yieldingly in the recess.

2. In a sofa, a main frame, an arm, and means for hinging and securing the arm adjustably in place on the frame, comprising two pins at a distance apart on one end of the arm, a plate opposite said pins fixed in the main frame and provided with a horizontal and a vertical slot into which the pins enter and are movable, and a latch having a tooth or teeth adapted to engage the pin in the horizontal slot, releasably.

3. In a sofa, a main frame, an arm, and means for hinging and securing the arm adjustably in place on the frame, comprising two pins at a distance apart on the end of the arm, a plate opposite said pins fixed in the main frame and provided with a horizontal and a vertical slot, into which slots said pins enter and are movable, and a latch having a tooth or teeth adapted to engage the pin in the horizontal slot releasably, and another tooth or teeth adapted to be contacted by said pin when moved laterally whereby the latch is lifted temporarily out of the path of the pin.

4. In a sofa and bed, the combination with a main frame, of a seat, and means for pivoting the seat in the main frame so that it can be turned over on the frame bottom up, comprising plates on the frame opposite the ends of the seat each plate being provided with a straight slot and a projecting pin, plates on the ends of the seat each plate being provided with a curved slot and a pin, the pins on the frame-plates entering the slots on the seat-plates, and the pins on the seat-plates entering the slots on the frame-plates, substantially as described.

5. In a sofa and bed, the combination with a main frame, of a seat, means pivoting the seat in the main frame so that it can be turned over on the frame bottom up, and a spring-held yielding stop on the frame adapted to engage and hold the seat against further turning in one direction, and an incline on the seat to be contacted by the pin whereby the pin is pushed out of the path of the seat when the seat is turned over in the other direction.

6. In a sofa and bed, the combination with a main frame and a movable arm, of a seat, and means for pivoting the seat in the main frame so that it can be turned over on the frame bottom up, a spring-actuated bolt mounted on the main frame adapted to engage the seat when turned over for a bed and hold it releasably against further turning, and a withdrawing-lever pivoted to the bolt and arranged to be actuated and held by a pin on the movable arm.

7. In a sofa-bed, an overturning seat, a mattress fitting to the bed-frame, and a folding flap on the end of the mattress having a stiffening device located and secured in and about the margin thereof.

In testimony whereof we affix our signatures in presence of two witnesses.

GUSTAV E. HOLMES.
AXEL G. BOSTROM.
JOHN M. BOSTROM.

Witnesses:
C. T. BENEDICT,
ANNA F. SCHMIDTBAUER.